NEUTRON DETECTION UNDER LOW GAMMA IRRADIATION

INVENTORS.
THOMAS J. MEAL &
ARTHUR J. STROKES
BY
*Fay & Fay*
ATTORNEYS

RESOLUTION AND COUNTING IN AN INTENSE GAMMA FIELD

COUNTING AFTER EXPOSURE TO AN INTENSE GAMMA IRRADIATION FIELD

United States Patent Office 3,381,131
Patented Apr. 30, 1968

3,381,131
NEUTRON DETECTOR FOR OPERATION IN
HIGH GAMMA FLUXES
Thomas J. Meal, Hoffman Estates, Ill., and Arthur J.
Stokes, Hudson, Ohio, assignors to Reuter-Stokes
Electronic Components, Inc., a corporation of Ohio
Filed May 4, 1965, Ser. No. 452,999
5 Claims. (Cl. 250—83.1)

ABSTRACT OF THE DISCLOSURE

A neutron detector which is substantially immune to gamma rays and capable of repetitive operation in high gamma-ray environments is disclosed as comprising a device including a chamber in which the inner walls of the chamber are coated with a getter material. The getter material acts to absorb impurities in the filler gas produced by dissociation due to background gamma radiation. In this manner, certain resulting gas ions are absorbed by the getter material to prevent the accumulation of electro-negative contaminants.

---

The present invention relates to a neutron responsive apparatus, more specifically to an improved neutron detector having increased accuracy, a minimum time delay between successive counting operations, and substantial immunity to damage due to gamma radiation.

Heretofore, neutron detectors using boron trifluoride as a filler gas in the ionization chamber have been highly sensitive to environmental gamma radiation, and, in fact, it is common knowledge that if the gamma field is of sufficient strength the counting characteristic of a neutron detector may deteriorate to the point of uselessness. Furthermore, the recovery of a detector after exposure to gamma radiation is slow and incomplete at best. Accordingly, a definite, fixed recovery period has been required between successive operations of such neutron detectors, after exposure to gamma radiation, in order to insure accuracy of counting. Various factors and reasons have been advanced for the deterioration of the counting characteristics of such neutron counters after exposure to a high gamma radiation. In the past a recovery period, of anywhere from one day to upwards of a month, depending upon the strength of the gamma field, has been found to be necessary before a counter will recover from the undesirable deterioration in its counting characteristic, such that accurate and reliable reusage is possible. The disadvantages of a counter having gradual deterioration in its counting characteristic are obvious.

Our findings indicate that, in the main, the deterioration of the counting characteristics can be attributed to the disassociation of the filling gas of the counter. More specifically, upon exposure to gamma radiation the gas, boron trifluoride, will be dissociated thereby. As a result of the dissociation of the gas molecules, an excessive number of negatively charged fluoride ions and boron difluoride will occur. The negative fluoride ions will result in a negative space charge, or cloud, being formed proximate to, and about, the centrally located anode of the counter. Thereafter, upon a neutron entering the counter proper gas amplification is impaired by this space cloud, and therefore, the ionization resulting from the neutron count is unable to generate an effective anode current. It is to overcome these and other prior art deficiencies that this invention is dedicated.

It is another object of this invention to permit effective, accurate, and immediate neutron detection in and around high gamma radiation environments.

It is another object of this invention to enable repeated accurate operations of a boron trifluoride proportional neutron counter after exposure to a high gamma field.

It is yet another object of this invention to prevent any dissociation of the gas in a boron trifluoride counter, due to gamma radiation, from affecting its response to a neutron count.

It is still a further object of this invention to build a gamma radiation resistant boron trifluoride neutron detector which is efficient, accurate, and economical.

It is still another object of this invention to build a gamma radiation resistant boron trifluoride neutron detector which is easy to construct.

It is still a further object of the invention to increase the response, efficiency, and accuracy of a boron trifluoride counter to a neutron count.

A better understanding of the invention and its versatility will be had by reference to the accompanying drawings in which.

Figure 3:
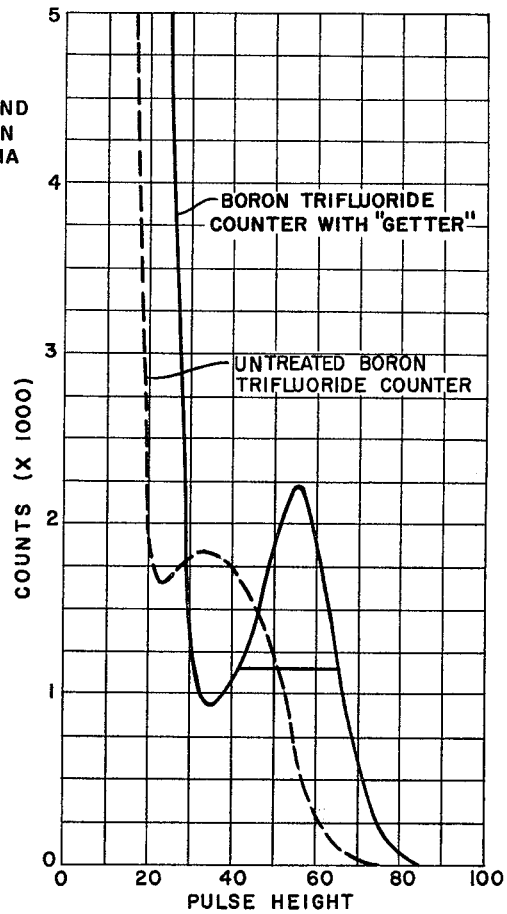
Figure 4:
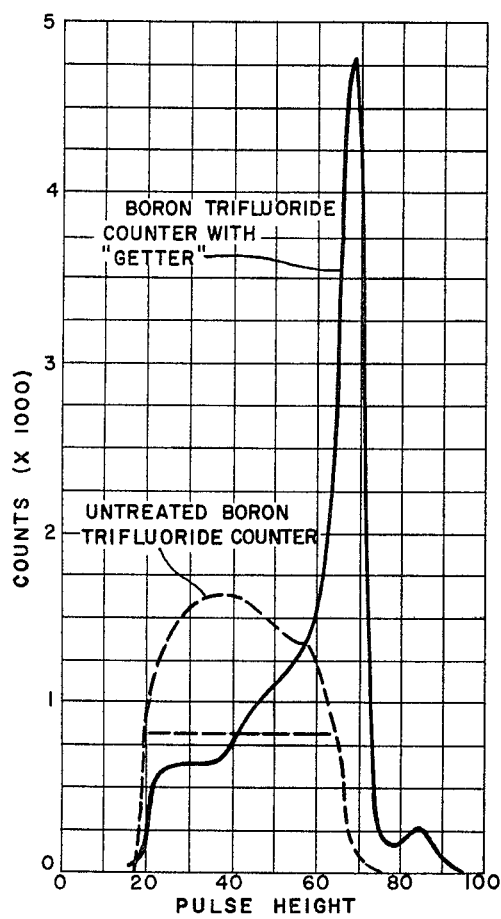

FIGURE 3 diagrammatically illustrates the improvement in resolution and counting performance of a boron trifluoride counter while being subjected to an intense gamma field by the application of a "getter" thereto;

FIGURE 4 diagrammatically shows the deterioration of the counting ability of an ordinary boron trifluoride counter after exposure to an intense gamma irradiation and the relative immunity of a getter coated boron trifluoride counter to deterioration after exposure of the same dose.

Figure 1:
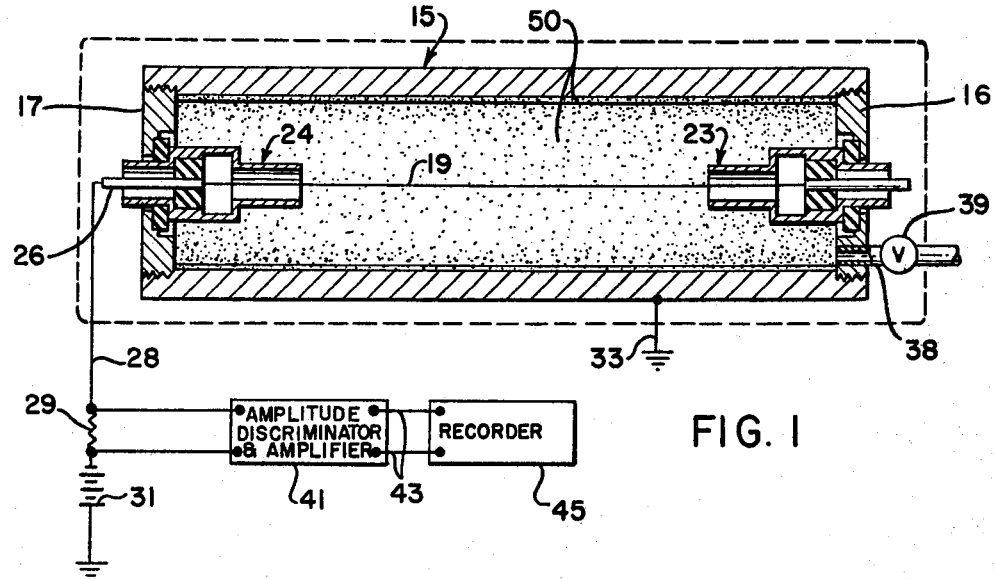
FIGURE 1 is a sectional view of the detector of the present invention illustrating the inner relationship of the operative elements making up the same, as well as the coating of a suitable "getter" material along the inner surface of the main casing.

Referring first to FIGURE 1, there is shown a neutron detector of the proportional counter type, which embodies the conventional details of construction therein. Accordingly, as shwn the counter includes a main cylindrical casing 15. Casing 15 is made in accordance with standard accepted practices and therefore, is made of relatively thin material, such as aluminum, which is substantially free of neutron resonances in the thermal and epithermal region. The end plates are fixedly attached to the ends of the casing and then sealed by welding or brazing to provide a hermetically sealed enclosure.

Also, extending co-axially with cylinder casing 15 is metallic anode 19. Anode 19 is shown to be longitudinally extending centrally of the casing from two suitable and appropriate anchoring terminals 23 and 24 mounted in end plates 16 and 17, respectively. Since, as will be discussed in more detail hereinbelow, a suitable anode voltage will have to be applied to anode 19, it is obvious that proper insulating precautions will have to be exercised to isolate anode 19 from walls 16 and 17 and casing 15. The proper insulating precautions are taken in the design of anchoring terminals 23 and 24 to insure proper operating conditions.

In addition, conducting rod 26 permits direct electrical communication between anode 19 and a suitable source of energizing potential 31, by way of series connected resistor 29 and wire 28, as shown. Casing 15 is returned to ground potential by way of a suitable connecting wire 33. Further, as also is common in prior art counters, a valve controlled pipe 38 is mounted in and projects through plate 16 for communication with the inner chamber of casing 15. Control valve 39 is a standard pressure type valve commercially available for this purpose. By use of pipe 38 and control valve 39 the inner chamber of casing 15 may be evacuated and the desired detector gas, at the prescribed pressure, may be supplied thereto. In our case we have chosen to employ $B^{10}$ enriched boron trifluoride as the detector gas. The purpose of using $B^{10}$ enriched boron trifluoride is that the high cross section nucleus provided by $B^{10}$ insures a relative ease of capturing a neutron and immediately releasing a fast alpha particle, with a lithium nucleus being left behind. In turn the fast alpha particle will result in an ionization of the boron trifluoride gas. The electrons produced by ionization of the boron trifluoride gas are then attracted to the anode, by the high positive potential applied thereto to result in a current pulse being generated across output resistor 29.

Numeral 41 represents a suitable amplitude discriminating and amplifying device. Amplifying and amplitude discriminating device 41 permits discrimination between pulses whch are the result of neutron ionization, and other pulses generated as a result of gamma or spurious activating sources. The pulses which are of suitable predetermined amplitude are then transmitted by way of connecting wires 43 to an appropriate recording device 45.

Lastly, as shown, by the cross section view of casing 15, the inner surface thereof is coated with a suitable ion absorbing material. In this case, since we are using boron trifluoride as our gas filler, we have found that coating the inner chamber walls of casing 15 with "Aquadag" results in a greatly improved operating proportional counter under either ordinary neutron detecting conditions, or high gamma flux, neutron detecting conditions. It should, of course, be appreciated that any suitable getter can be substituted for "Aquadag," and that it is only disclosed at this point as our preferred embodiment and not to limit the scope of our invention.

The "Aquadag" employed is merely a shorthand expression for defining the commercially available colloidal suspension comprising a pure deflocculated graphite in water. In essence it is a graphite sol which is obtained by masticating with tannin and water followed by dilution with water containing a small amount of ammonia.

The deflocculated graphite in water getter may be applied in any conventional manner such as by a brush applicator while it is in a liquid state, or it may be poured into the chamber before any working parts are placed therein and then by selectively rotating the casing insure that the inner surfaces are completely coated.

We have also found that it is not necessary that the entire inner wall surface of the chamber be coated in order to insure improved counter characteristics and, in fact, it has been determined that substantially less than the entire inner surface may be coated with a suitable gettering material without any sacrifice in performance.

The purpose of the gettering agent is to absorb any impurities, especially fluorine ions created by dissociation occurring in the filler gas, which are the result of either gamma exposure or any other reasons.

*Theory of operation*

Boron trifluoride counters have long been used for the detection of thermal neutrons (neutrons having energy levels of about .025 electron volt) with usually adequate success. In practice it has been found that $B^{10}$ enriched boron trifluoride provides an even better neutron detecting filler gas because of the high cross sectional nucleus provided thereby to neutrons. However, since a neutron is neutral in charge it is incapable, by itself, of causing an ionization of the filler gas. Instead the nuclear reaction resulting from the collision of a neutron and $B^{10}$ results in the production of a fast alpha particle and a lithium ion. This reaction can be written as:

$$_0n^1 + {}_5B^{10} \rightarrow {}_3Li^7 \pm {}_2He^4$$

where $_2He^4$ is defined as the fast alpha particle.

The reaction of the fast alpha particle with boron trifluoride gas then results in an ionization of the gas to produce electrons which are then attracted to the highly positive anode 19. The electrons will then result in the generation of a current pulse across output resistor 29, and from there will be passed to the suitable discriminating and recording units 41 and 45, respectively. The results of recorder 45 can then be placed in standard diagram form, see FIGURES 2 through 4, whereat, are shown a series of response curves having the pulse amplitude as the X co-ordinate and the number of counts as the Y co-ordinate.

Moreover, it is frequently necessary to employ a neutron detector in monitoring capacity, for example, near and around nuclear reactors and accelerators, whereat the environmental gamma radiation background approaches several milliroentgen per hour. Under these moderate gamma irradiation conditions untreated boron trifluoride counters may be employed with tolerable results. This is not to imply that improvement will not occur by coating the chamber walls with an appropriate getter under low gamma irradiation conditions, see for example FIGURE 2 whereat the solid graph illustrates the resulting improvement in resolution after the application of a getter to the chamber inner walls, over its dashed line counterpart which illustrates the results of an untreated counter operating under the same conditions. It can thus be seen that the results under low gamma irradiation conditions are tolerable with a treated or an untreated boron trifluoride counter.

Figure 2:
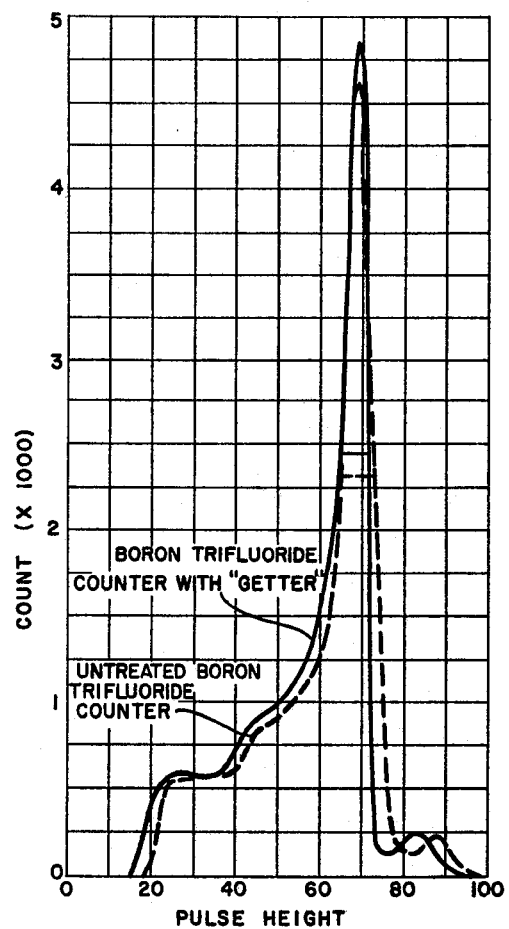
FIGURE 2 illustrates in diagrammatical form the resulting increase in efficiency and accuracy of a boron trifluoride counter for neutron detection after the application of a "getter" thereto.

However, our invention's main purpose is fully appreciated in the detection of neutrons in intense gamma fields. Under intense gamma field conditions it has been found that the present commercially available boron trifluoride proportional counter becomes unreliable to the point of uselessness. For example, keeping in mind the spectra resulting under low, or non-existing, gamma irradiation as shown in FIG. 2, reference is now made to FIG. 3 whereat is shown in dashed lines the response of a boron trifluoride counter during a concurrent gamma dose of 800 roentgens per hour. The total absence of resolution, of course, makes the counter unsuitable for any use.

Various theories have been propounded to explain the poor counting characteristics of a boron trifluoride counter under gamma bombardment conditions. It is our feeling that the deterioration of the counting characteristics may be properly explained with the aid of facts and observations we have made over an extended period of experimentation. More specifically, it is our feeling that the gamma radiation results in a dissociation of the boron trifluoride molecule into negative fluoride ions and boron difluoride. Now since, as has been explained, the anode 19 of the proportional counter is maintained at a suitably high positive potential by battery 31, a migration of the negative fluoride ions theretowards will occur. This will eventually result in the formation of a negative space charge around anode 19. This negative space charge will result in a repulsion of most of the ionization due to neutrons and, of course, will result in reduced amplitude pulses being generated across output resistor 29. This further results in a gradual deterioration of counting characteristics until the counter is for all practical purposes useless, see the dashed graph of FIG. 3. The solid graph of FIG. 3 illustrates the improved results obtained by the getter coated counter, under neutron detecting conditions, where the counter is concurrently also being subjected to an intense gamma field. The improved results are attributable to the getter material being operable to absorb the ions produced by dissociation of the filler gas and accordingly, preventing the formation of a negative space charge around anode 19.

The deterioration in counting characteristics of boron trifluoride proportional counters, after exposure to high roentgen gamma fields, is somewhat permanent in nature. Therefore, after exposure to a high gamma field, reliable neutron counting operations may be curtailed for periods ranging from one day to several weeks. The expense involved in having a multiplicity of counters so that one may be shelved for extended periods of recovery time after gamma exposure is obvious, and these conditions and circumstances are avoidable through the use of our invention.

We have found that by coating the inner surface of casing 15 with a suitable getter 50, such as "Aquadag," any dissociation of the boron trifluoride gas by gamma radiation will be rapidly corrected with no deterioration in the counting characteristic curve. Accordingly, the solid graph of FIG. 3 illustrates the improved characteristic curve obtained from a counter tube having an "Aquadag" coating, while being subjected to a gamma radiation of 5,000 roentgens per hour. It is seen that, although the curve is somewhat changed due to the gamma radiation, the tube is still useful and the counting characteristics reliable.

As important as the ability of a boron trifluoride proportional counter treated with an absorbing material to effectively register neutron counts, while concurrently being subjected to a high gamma irradiation field without any significant deterioration in the counting ability, is the fact that the counter is immediately available for repeated operations without the necessity of shelving it to enable it to recover from the effects of dissociation. The ability of a proportional neutron counter, treated in a manner as disclosed by our invention, for successive operations immediately after being subjected to a high roentgen gamma field is diagrammatically shown in FIG. 4. The dashed curve of FIG. 4 illustrates the unreliable counting which results from the use of a proportional counter which has not had its inner surface area coated with "Aquadag," or any other suitable ion absorbing material soon after it has been exposed to an intense gamma field. It is obvious from the dashed graph that the sensitivity of this counter has deteriorated to the point of absolute unreliability and uselessness. One the other hand, the solid curve of FIG. 4 illustrates that the counting characteristics of a proportional counter which has been treated with "Aquadag," or any other suitable gettering material, is substantially unaffected by having been exposed to the high gamma field, and can thereafter be reliably and immediately used for normal neutron counting with utmost assurance in the results.

While it will be apparent that the embodiment of this invention herein disclosed is well calculated to fulfill the objects of the invention, it will be appreciated that the invention is susceptible to modification, variation and change without the parting from the proper scope of fair meaning of the subjoined claims.

The invention claimed is:

1. A proportional counter radiation detector which is substantially immune to gamma rays and is capable of repetitive operation irrespective of the gamma-ray level of the environment in which it is to be used, comprising, an elongated cylindrical main body member, end plates fixedly attached to said elongated cylindrical body member hermetically sealing the same, means for evacuating the elongated cylindrical body and filling the same with a suitable filler gas for neutron detection, an electrode longitudinally extending coaxially through said elongated cylindrical main body member, said electrode being fixedly attached to said end plates, circuit means operatively connecting a source of suitable direct current potential to said electrode and said elongated cylindrical body member, a thin layer of getter coating the inner surface of said elongated cylindrical main body member, such that upon filler gas dissociation occurring substantially all resulting gas ions will be absorbed by said getter to prevent the formation of a surrounding space charge about said electrode and thus permit repetitive highly accurate neutron detection.

2. A proportional counter radiation detector having substantial gamma-ray immunity and capable of repetitive operation in high gamma-ray environments comprising, a pressure-tight closed elongated cylindrical container, said container being made of suitable material to permit neutron penetration and transmission therethrough, a suitable gettering material coating the inner surface of said elongated cylindrical container, an electrode longitudinally extending coaxially through said elongated cylindrical container, means for filling said pressure-tight container with a suitable filler gas at a desired pressure, circuit means for applying a source of suitable direct current potential to said electrode and said elongated cylindrical container, such that upon passage of a neutron through said cylindrical container ionization of said filler gas occurs, said getter material coating the inner surface of said cylindrical container absorbing substantially all ions resulting from dissociation of said filler gas to prevent deterioration of the counting ability of said counter and thus permit repetitive operations of the same.

3. A proportional counter radiation detector having substantial gamma-ray immunity and capable of repetitive operation in high gamma-ray environments comprising, a pressure-tight closed elongated cylindrical container, said container being made of suitable material to permit neutron penetration and transmission therethrough, a suitable getter material coating the inner surface of said elongated cylindrical container, an electrode longitudinally extending coaxially through said elongated cylindrical container, means for filling said pressure-tight container with $B^{10}$ enriched boron trifluoride gas at a predetermined pressure, circuit means for applying a source of suitable direct current potential to said electrode and said elongated cylindrical container, said circuit means including a resistor across which pulses due to gas ionization will be available, such that upon passage of a neutron through said elongated cylindrical container ionization of the $B^{10}$ enriched boron trifluoride gas occurs, said getter coating the inner surface of said cylinder absorbing substantially all fluoride ions resulting from dissociation of said boron trifluoride gas to prevent deterioration of the counting ability of said counter and thus permit repetitive operation of the same.

4. A proportional counter radiation detector having substantial gamma-ray immunity and capable of repetitive operation in high gamma-ray environments comprising, a pressure-tight closed elongated cylindrical container, said container being made of suitable material to permit neutron penetration and transmission therethrough, a getter material comprising deflocculated graphite in water coating the inner surface of said elongated cylindrical container, an electrode longitudinally extending coaxially through said elongated cylindrical container, means for filling said pressure-tight container with $B^{10}$ enriched boron trifluoride at predetermined pressure levels, circuit means including an output signal resistor for applying a source of suitable direct current potential to said electrode and said elongated cylindrical container, such that upon passage of a neutron through said cylinder ionization of said $B^{10}$ enriched boron trifluoride occurs, said deflocculated graphite in water coating the inner surface of said cylinder absorbing substantially all fluoride ions resulting from dissociation of said boron trifluoride gas to prevent deterioration of the counting ability of said counter and thus permit repetitive operations of the same.

5. A proportional counter radiation detector having substantial gamma-ray immunity and capable of repetitive operations in high gamma-ray environments comprising, a pressure-tight closed elongated cylindrical container, said container being made of suitable material to permit neutron penetration and transmission therethrough, a suitable getter material coating the inner surface of said elongated cylindrical container, an electrode longitudinally extending coaxially through said elongated cylindrical container, means for filling said pressure-tight container with $B^{10}$ enriched boron trifluoride at a desired pressure level, circuit means, including an output resistor, for applying a source of suitable direct current potential to said electrode and said elongated cylindrical container, amplitude discriminating means operatively connected across said output resistor, recording means in circuit with said amplitude discriminator, such that upon passage of a neutron through said cylinder ionization of said $B^{10}$ enriched boron trifluoride gas occurs, said getter coating the inner surface of said cylinder absorbing substantially all fluoride ions resulting from dissociation of said boron trifluoride gas due to high gamma radiation to prevent deterioration of the counting ability of said counter and thus permit repetitive operations of the same, said amplitude discriminator and recording means resulting in recordation of pulses having a predetermined magnitude.

References Cited

UNITED STATES PATENTS

| | | | |
|---|---|---|---|
| 1,643,810 | 9/1927 | Gustin | 313—178 |
| 2,376,196 | 5/1945 | Scherbatskoy | 313—61 X |
| 2,462,471 | 2/1949 | Crumrine | 313—61 |
| 3,043,954 | 7/1962 | Boyd et al. | 250—83.1 |
| 3,102,198 | 8/1963 | Bonner | 250—83.1 |

RALPH G. NILSON, *Primary Examiner.*

ARCHIE R. BORCHELT, *Examiner.*

A. B. CROFT, *Assistant Examiner.*